United States Patent
Brownell et al.

(10) Patent No.: US 9,475,932 B2
(45) Date of Patent: Oct. 25, 2016

(54) COMPOSITION COMPRISING A LATEX AND A HEUR THICKENER

(71) Applicant: Rohm and Haas Company, Philadelphia, PA (US)

(72) Inventors: Arnold S. Brownell, Lansdale, PA (US); Yogesh Tiwary, Bangalore (IN)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/797,696

(22) Filed: Jul. 13, 2015

(65) Prior Publication Data

US 2016/0040004 A1    Feb. 11, 2016

Related U.S. Application Data

(60) Provisional application No. 62/034,824, filed on Aug. 8, 2014.

(51) Int. Cl.

| | |
|---|---|
| *C08F 265/06* | (2006.01) |
| *C08L 33/14* | (2006.01) |
| *C09D 7/00* | (2006.01) |
| *C08L 51/00* | (2006.01) |
| *C08L 75/04* | (2006.01) |

(52) U.S. Cl.
CPC .............. *C08L 33/14* (2013.01); *C08F 265/06* (2013.01); *C08L 51/003* (2013.01); *C08L 75/04* (2013.01); *C09D 7/002* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 7,179,531 B2* | 2/2007 | Brown | C08F 2/001 428/407 |
| 2002/0165313 A1* | 11/2002 | Tanzer | C09B 67/0063 524/589 |
| 2003/0018103 A1 | 1/2003 | Bardman et al. | |
| 2004/0054063 A1* | 3/2004 | Brown | C08F 2/001 524/500 |
| 2015/0005446 A1* | 1/2015 | Bohling | C08F 2/001 524/807 |
| 2016/0040004 A1* | 2/2016 | Brownell | C08L 33/14 523/122 |

FOREIGN PATENT DOCUMENTS

WO    2013116318 A1    8/2013

* cited by examiner

*Primary Examiner* — Peter A Salamon
(74) *Attorney, Agent, or Firm* — Reid S. Willis

(57) ABSTRACT

The present invention relates to a composition comprising stable aqueous dispersion of polymer particles with acorn morphology, a hydrophobically modified ethylene oxide urethane based rheology modifier (HEUR) and a substantial absence of pigment particles with a refractive index in the range of from 2.0 and 3.0. The composition imparts improved HEUR efficiency for coating compositions such as deep base coating compositions.

14 Claims, No Drawings

COMPOSITION COMPRISING A LATEX AND A HEUR THICKENER

BACKGROUND OF THE INVENTION

The present invention relates to a composition comprising a latex, more particularly a latex with acorn morphology, and a hydrophobically modified ethylene oxide urethane based rheology modifier (HEUR).

Stable aqueous dispersions of particle particles (latexes) characterized by a core-shell morphology wherein the core protuberates from the shell have been described. For example, U.S. Pat. No. 7,179,531 (Brown et al.) discloses a dispersion of multistage polymer particles characterized by a relatively small core portion protuberating from a relatively large shell portion of each particle, with the core portion being preferentially functionalized with $TiO_2$-adsorbing groups. These so-called "acorn" particles are disclosed as being useful for preparing $TiO_2$-polymer composite particles that provide dried coatings with improved hiding. WO 2013116318 A1 (Bohling et al.) discloses acorn dispersions with phosphorus acid groups concentrated at the protuberating core portion of the acorn, resulting in overall reduction in grit formation in a coating formulation.

The advantages of acorn technology in coatings formulations have yet to be fully explored and it would be desirable to determine the effects of this morphology on the efficiency of rheology modifiers such as HEURs.

SUMMARY OF THE INVENTION

The present invention addresses a need in the art by providing a composition comprising 1) a stable aqueous dispersion of polymer particles having a particle size as measured by dynamic light scattering in the range of from 70 nm to 300 nm, wherein the polymer particles have a core-shell morphology wherein the core protuberates from the shell; 2) a hydrophobically modified ethylene oxide urethane based rheology modifier; 3) an extender; and 4) a substantial absence of pigment particles with a refractive index in the range of from 2.0 and 3.0. The composition of the present invention gives surprisingly higher KU and ICI viscosities or higher thickening efficiency than compositions comprising dispersions of non-acorn polymers at comparable levels of HEUR thickener.

DETAILED DESCRIPTION OF THE INVENTION

The present invention is a composition comprising 1) a stable aqueous dispersion of polymer particles having a particle size as measured by dynamic light scattering in the range of from 70 nm to 300 nm, wherein the polymer particles have a core-shell morphology wherein the core protuberates from the shell; 2) a hydrophobically modified ethylene oxide urethane based rheology modifier; 3) an extender; and 4) a substantial absence of pigment particles with a refractive index in the range of from 2.0 and 3.0.

As used herein, "a substantial absence of pigment particles" means that the pigment volume concentration (PVC) of pigment particles with a refractive index (RI) from 2.0 to 3.0 is not more than 10%, preferably not more than 5%, more preferably not more than 1%.

The polymer particles are characterized by a core-shell morphology wherein the core protuberates from the shell (also referred to as acorn morphology), as illustrated:

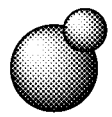

The polymer particles are preferably acrylic, styrene-acrylic, or vinyl ester-acrylic polymers (including vinyl acetate-acrylic and vinyl versatate-acrylic polymers).

The protuberating core portion of the polymer particles preferably comprises from 50 to 99 weight percent structural units of a styrene or acrylate monomer or combinations thereof. As used herein, acrylate monomer refers to acrylates such as ethyl acrylate, butyl acrylate, and 2-ethylhexyl acrylate, as well as methacrylates such as methyl methacrylate and butyl methacrylate. As used herein, the term "structural unit" of the named monomer, refers to the remnant of the monomer after polymerization. For example, a structural unit of methyl methacrylate is as illustrated:

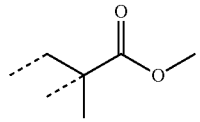

structural unit of methyl methacrylate, where the dotted lines represent the points of attachment of the structural unit to the polymer backbone.

The core preferably comprises structural units of i) methyl methacrylate, butyl methacrylate, or styrene or a combination thereof; and ii) ethyl acrylate, butyl acrylate, or 2-ethylhexyl acrylate or a combination thereof. A more preferred combination of bulk monomers is methyl methacrylate or styrene or a combination thereof with ethyl acrylate, butyl acrylate, or 2-ethylhexyl acrylate or a combination thereof, with methyl methacrylate and butyl acrylate being especially preferred.

The core preferably comprises structural units of methyl methacrylate or styrene or a combination thereof at a concentration of from 5 weight percent, more preferably from 20 weight percent, to 60 weight percent, more preferably to 40 weight percent, based on the weight of the core; and preferably contains structural units of butyl acrylate, preferably at a concentration of from 35 weight percent, more preferably from 50 weight percent, to 90 weight percent, more preferably to 70 weight percent, based on the weight of the core.

The core further preferably comprises from 0.2, more preferably from 0.5 to preferably 10, more preferably to 5, and most preferably to 3 weight percent structural units of a carboxylic acid monomer or a sulfur acid monomer or a salt thereof or a combination thereof. Suitable carboxylic acid monomers include acrylic acid, methacrylic acid, itaconic acid, and salts thereof; suitable sulfur acids include sulfoethyl methacrylate, sulfopropyl methacrylate, styrene sulfonic acid, vinyl sulfonic acid, and 2-(meth)acrylamido-2-methyl propanesulfonic acid, and salts thereof. Preferably, the core comprises only structural units of a carboxylic acid monomer or a salt thereof, more preferably acrylic acid or methacrylic acid or salts thereof or combinations thereof. A preferred concentration of structural units of acrylic acid or methacrylic acid is from 0.1, more preferably from 0.5, to 3 weight percent, based on the weight of the core.

The core further preferably comprises from 0.1, more preferably from 0.3, and most preferably from 0.5 weight percent to preferably 20, more preferably to 5, and most preferably to 3 weight percent structural units of a multi-ethylenically unsaturated monomer, based on the weight of the core. An example of a preferred multiethylenically unsaturated monomer is a diethylenically unsaturated monomer such as allyl methacrylate.

The core further comprises from 0, preferably from 2, more preferably from 5, to 15 preferably to 10 weight percent structural units of a phosphorous acid monomer or a salt thereof, based on the weight of the core. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

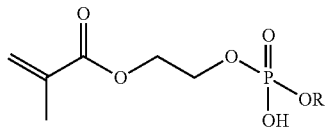

where R is H or

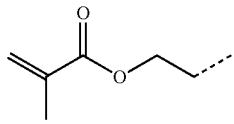

wherein the dotted line represents the point of attachment to the oxygen atom.

The core preferably has a volume average diameter in the range of from 30, more preferably from 40 nm, to 90, more preferably to 80 nm (as measured by a BI-90 Dynamic Light Scattering Particle Analyzer) and preferably a $T_g$ as calculated by the Fox equation in the range of from −30° C., more preferably from −20° C., to preferably 60° C., more preferably to 40° C., and most preferably to 20° C.

The shell of the polymer particles preferably comprises methyl methacrylate or styrene or a combination thereof at a concentration preferably in the range of from 35 weight percent to 75 weight percent, more preferably to 55 weight percent, based on the weight of the shell; and 2) structural units of butyl acrylate or ethyl acrylate or a combination thereof, more preferably structural units of butyl acrylate, preferably at a concentration in the range of from 25 weight percent, more preferably from 45 weight percent to preferably 70 weight percent, more preferably to 65 weight percent, based on the weight of the shell.

The shell also preferably comprises from 0.1 to 5 weight percent structural units of a carboxylic acid monomer or a sulfur acid monomer or a combination thereof, based on the weight of the shell. More preferably the shell comprises from 1 to 2 weight percent structural units of acrylic acid or methacrylic acid, or a combination thereof, based on the weight of the shell.

The polymer particles may comprise up to 4 weight percent structural units of a phosphorus acid monomer and, in one embodiment, may be absent or substantially absent of phosphorus acid functionality (that is, <0.1 weight percent, based on the weight of the polymer particles); phosphorus acid functionality may be distributed throughout the particle, but the shell preferably comprises less than 0.1, more preferably less than 0.01 weight percent structural units of a phosphorus acid monomer, based on the weight of the shell, and preferably less than 0.1, more preferably less than 0.01 weight percent structural units of a multiethylenically unsaturated monomer, based on the weight of the shell. The shell most preferably includes neither structural units of a phosphorus acid monomer nor of a multiethylenically unsaturated monomer.

The weight-to-weight ratio of the shell to the core is preferably in the range of from 3:1, more preferably from 5:1, to 50:1, preferably to 35 to 1. The polymer particles preferably have a particle size as measured by dynamic light scattering in the range of from 90 nm to 200 nm.

In a preferred method of making the stable aqueous dispersions of polymer particles, a first monomer emulsion can be prepared by contacting water, butyl acrylate, methyl methacrylate, allyl methacrylate, optionally phosphoethyl methacrylate, and a carboxylic acid monomer under emulsion polymerization conditions to form a precursor to the protuberating core. Then, water, the precursor, and a monomer emulsion of butyl acrylate, methyl methacrylate, and a carboxylic acid monomer are reacted under emulsion polymerization conditions to form the stable aqueous dispersion of polymer particles with acorn morphology.

The dispersion of polymer particles with acorn morphology are then combined with the HEUR rheology modifier to make a composition that is substantially free of pigment particles with a refractive index in the range of from 2.0 and 3.0 such as $TiO_2$ and ZnO. HEUR rheology modifiers are well known in the art. Commercially available examples include ACRYSOL™ RM-2020 and ACRYSOL™ RM-8W Rheology Modifiers. (ACRYSOL is a trademark of The Dow Chemical Company or its Affiliates).

The composition may include other ingredients selected from the group consisting of dispersants, defoamers, surfactants, solvents, additional binders, extenders, coalescents, biocides, opaque polymers, and colorants.

It has surprisingly been discovered that the polymer particles with acorn morphology impart improvements in HEUR efficiency, especially for deep base formulations that are absent or substantially absent of pigment particles such as $TiO_2$ or ZnO. As the following examples demonstrate, this improvement in efficiency has even been observed for acorn particles that are free of phosphorus acid functionality.

Example 1

Synthesis of Acorn Functionalized with PEM

A. Core (Pre-Form) Synthesis

A first monomer emulsion was prepared by mixing deionized water (200 g), Disponil FES 993 surfactant (43 g, 30% active), butyl acrylate (371.2 g), methyl methacrylate (195.2 g), allyl methacrylate (9.6 g), phosphoethyl methacrylate (51.2 g, 60% active), and methacrylic acid (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion was added over 40 min, followed by a rinse (25 g), then an initiator solution of sodium persulfate (0.64 g) dissolved in deionized water (50 g) was added over 50 min. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size was 60-75 nm by dynamic light scattering, using a Brookhaven BI-90 Dynamic Light Scattering Particle Size Analyzer, and the solids was found to be 40-41%.

B. Acorn Core-Shell Synthesis

A second monomer emulsion was prepared using deionized water (360 g), sodium dodecylbenzene sulfonate (66.5 g, 23% active), Disponil FES 993 surfactant (51 g, 30% active), butyl acrylate (810.9 g), methyl methacrylate (685.1 g), and acrylic acid (34 g). To a 5-L, four necked round bottom flask equipped with a paddle stirrer, a thermometer, $N_2$ inlet, and a reflux condenser was added deionized water (950 g). The contents of the flask were heated to 84° C. under $N_2$ and stirring was initiated. An aqueous solution sodium persulfate (5.1 g in 20 g deionized water), followed by a rinse of deionized water (5 g) was added to the kettle. The pre-form from Step A was then added (425 g) and the temperature of contents of the flask was readjusted to 84° C. The second monomer emulsion was then added to the flask, followed by addition of a solution containing sodium persulfate (1.7 g) and ammonium hydroxide (4 g, 29% active) dissolved in deionized water (56 g) over a total period of 80 min. The contents of the flask were maintained at a temperature of 84° C. during these additions. When all additions were complete, the flask containing the second monomer emulsion was rinsed with deionized water (25 g), which was then added to the flask.

The contents of the flask were cooled to 65° C. and a catalyst/activator pair was added to the flask to reduce residual monomer. The polymer was then neutralized to pH 8.5 with a dilute ammonium hydroxide solution. The measured particle size was 145 nm and the solids content was found to be 48%.

Example 2

Synthesis of Acorn not Functionalized with Phosphorus Acid Groups (TJB-1139)

A. Core (Pre-Form) Synthesis

A first monomer emulsion was prepared by mixing deionized water (200 g), Disponil FES 993 surfactant (43 g, 30% active), butyl acrylate (371.2 g), methyl methacrylate (214.4 g), allyl methacrylate (9.6 g), acrylic acid (32 g) and methacrylic acid (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under $N_2$ and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion was added over 40 min, followed by a rinse (25 g), then an initiator solution of sodium persulfate (0.64 g) dissolved in deionized water (50 g) was added over 50 min. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 5.5 with a dilute solution of ammonium hydroxide. The measured particle size was 66 nm by dynamic light scattering, using a Brookhaven BI-90 Dynamic Light Scattering Particle Size Analyzer, and the solids was found to be 40.8%.

B. Acorn Core-Shell Synthesis

The process of Example 1 Step B was substantially followed in the amounts specified to yield a polymeric dispersion with particle size of 135 nm and a solids content of 47.8%.

Comparative Example 1

Synthesis of Spherical Polymeric Latex Functionalized with PEM

A first monomer emulsion was prepared by mixing deionized water (200 g), Disponil FES 993 surfactant (42.45 g, 30% active), butyl acrylate (270.3 g), methyl methacrylate (199.75 g), phosphoethyl methacrylate (60% active, 29.75 g), and acrylic acid (10.2 g). A second monomer emulsion was prepared by mixing deionized water (420 g), sodium dodecylbenzene sulfonate (23% active, 66.52 g), butyl acrylate (630.7 g), methyl methacrylate (535.5 g), and acrylic acid (23.8 g).

To a 5-L, four necked round bottom flask equipped with a paddle stirrer, a thermometer, nitrogen inlet, and a reflux condenser was added deionized water (900 g) and Disponil FES 32 surfactant (8.55 g, 30% active). The contents of the flask were heated to 85° C. under $N_2$ and stirring was initiated. A portion of the first monomer emulsion (130 g) was then added, quickly followed by a solution of sodium persulfate (6.85 g) dissolved in deionized water (20 g) followed by a rinse of deionized water (5 g). After stirring for 10 min, the remainder of the first monomer emulsion was added over 40 min, followed by a rinse (25 g), then an initiator solution of sodium persulfate (0.40 g) dissolved in deionized water (30 g) was added over 30 min. After the monomer emulsion feed was complete, the contents of the flask were held at 85° C. for 10 min, after which time the co-feed was complete; and the contents of the flask were then held at 85° C. for an additional 10 min.

The second monomer emulsion, an ammonium persulfate solution (1.1 g dissolved in 80 g of water), and aqueous $NH_3$ (12 g, 29% active, dissolved in 28 g of water) were added linearly and separately to the flask over 80 min. The contents were maintained at 85° C. during the addition. After the completion of the additions, the container with the second monomer emulsion was rinsed with deionized water (25 g), which was added to the reaction flask.

The contents of the flask were cooled to 65° C. and a catalyst/activator pair was added to the flask to reduce residual monomer. The polymer was neutralized to pH 8.5 with dilute $NH_3$ (aq). (Particle size=115 nm; solids=46.9%).

Comparative Example 2

Synthesis of Spherical Polymeric Latex not Functionalized with Phosphorus Acid Groups A first monomer emulsion was prepared by mixing deionized water (450 g), Disponil FES 993 surfactant (42.45 g, 30% active), sodium dodecylbenzene sulfonate (23% active, 66.52 g), butyl acrylate (901 g), methyl methacrylate (765 g), and acrylic acid (34 g). A second monomer emulsion was prepared by mixing deionized water (420 g), sodium dodecylbenzene sulfonate (23% active, 66.52 g), butyl acrylate (630.7 g), methyl methacrylate (535.5 g), and acrylic acid (23.8 g).

To a 5-L, four necked round bottom flask equipped with a paddle stirrer, a thermometer, nitrogen inlet, and a reflux condenser was added deionized water (900 g) and Disponil FES 32 surfactant (8.55 g, 30% active). The contents of the flask were heated to 85° C. under $N_2$ and stirring was initiated. A portion of the monomer emulsion (130 g) was then added, quickly followed by a solution of sodium persulfate (6.85 g) dissolved in deionized water (20 g) followed by a rinse of deionized water (5 g). After stirring for 10 min, the remainder of the monomer emulsion and an initiator solution of sodium persulfate (1.5 g) dissolved in deionized water (120 g) were added linearly and separately over 120 min. After 40 min from the onset of monomer emulsion addition, an aqueous solution ammonium hydroxide (29% active, 8 g dissolved in 32 g of water) was added linearly and separately over the remaining 80 min of the monomer emulsion addition.

The contents of the flask were maintained at 85° C. during the monomer emulsion addition. After the completion of the additions, the container with the monomer emulsion was rinsed with deionized water (25 g), which was added to the reaction flask. The contents of the reaction flask were maintained at 85° C. for an additional 10 min. The contents of the flask were cooled to 65° C., at which time a catalyst/activator pair was added to the flask to reduce residual monomer. The polymer was neutralized to pH 8.5 with dilute $NH_3$(aq). (Particle size=122 nm; solids=49.1%).

Table 1 shows the correlation between particle morphology and viscosity.

TABLE 1

Comparison of ICI and KU Viscosities for Acorn and non-Acorn Dispersions

| Example No. | Comp 1 | 1 | Comp 2 | 2 |
|---|---|---|---|---|
| Particle Size (nm) | 116 | 145 | 122 | 135 |
| Polymer solids (wt %) | 46.9 | 48 | 49.1 | 47.8 |
| Polymer (g) | 80.47 | 78.64 | 76.88 | 78.97 |
| Water (g) | 12.70 | 14.52 | 16.28 | 14.19 |
| BYK-348 Surfactant (g) | 0.37 | 0.37 | 0.37 | 0.37 |
| Foamstar A-34 Defoamer (g) | 0.16 | 0.16 | 0.16 | 0.16 |
| Texanol Coalescent (g) | 0.75 | 0.75 | 0.75 | 0.75 |
| $NH_3$ (28 wt % solution in water) (g) | 0.44 | 0.37 | 0.23 | 0.25 |
| ACRYSOL RM-2020 NPR HEUR (g) | 2.29 | 2.29 | 2.29 | 2.29 |
| ACRYSOL RM-8W HEUR (g) | 0.79 | 0.79 | 0.79 | 0.79 |
| Water (g) | 2.02 | 2.10 | 2.24 | 2.22 |
| Total Weight (g) | 100.00 | 100.00 | 100.00 | 100.00 |
| Paint pH | 9.0 | 9.1 | 9.1 | 8.9 |
| Equilibrated (2 week) KU Viscosity (Krebs Units) | 122 | 132 | 111 | 127 |
| Equilibrated (2 week) ICI Viscosity (Poise) | 1.1 | 1.3 | 1.0 | 1.2 |

As Table 1 shows, higher KU and ICI viscosities are observed for formulations containing polymeric dispersions having acorn morphology as compared with dispersions that are non-acorns. This phenomenon was observed whether the acorn was functionalized with a phosphorus acid monomer (PEM in this case) or not, although acorns functionalized with PEM showed even higher viscosities.

The invention claimed is:

1. A composition comprising 1) a stable aqueous dispersion of polymer particles having a particle size as measured by dynamic light scattering in the range of from 70 nm to 300 nm, wherein the polymer particles have a core-shell morphology wherein the core protuberates from the shell; 2) a hydrophobically modified ethylene oxide urethane based rheology modifier; 3) an extender; and 4) less than 5% pigment volume concentration of pigment particles with a refractive index in the range of from 2.0 and 3.0.

2. The composition of claim 1 wherein the polymer particles are acrylic, styrene-acrylic, or vinyl ester polymers; and wherein the particle size of the polymer particles is 90 nm to 200 nm.

3. The composition of claim 2 wherein the polymer particles comprise structural units of a phosphorus acid monomer.

4. The composition of claim 3 wherein the cores of the polymer particles comprise from 2 to 15 weight percent structural units of phosphoethyl methacrylate.

5. The composition of claim 1 wherein the shells of the polymer particles contain less than 0.1 weight percent structural units of a phosphorus acid monomer, based on the weight of the shells of the polymer particles.

6. The composition of claim 1 which comprises less than 1% pigment volume concentration of pigment particles with a refractive index in the range of from 2.0 and 3.0.

7. The composition of claim 1 which further includes one or more ingredients selected from the group consisting of dispersants, defoamers, surfactants, solvents, additional binders, coalescents, biocides, opaque polymers, and colorants.

8. A composition comprising 1) a stable aqueous dispersion of polymer particles having a particle size as measured by dynamic light scattering in the range of from 70 nm to 300 nm, wherein the polymer particles have a core-shell morphology wherein the core protuberates from the shell; 2) a hydrophobically modified ethylene oxide urethane based rheology modifier; 3) an extender; and 4) less than 5% pigment volume concentration of pigment particles with a refractive index in the range of from 2.0 and 3.0, wherein the composition is a deep base formulation.

9. The composition of claim 8 wherein the polymer particles are acrylic, styrene-acrylic, or vinyl ester polymers; and wherein the particle size of the polymer particles is 90 nm to 200 nm.

10. The composition of claim 9 wherein the polymer particles comprise structural units of a phosphorus acid monomer.

11. The composition of claim 10 wherein the cores of the polymer particles comprise from 2 to 15 weight percent structural units of phosphoethyl methacrylate.

12. The composition of claim 8 wherein the shells of the polymer particles contain less than 0.1 weight percent structural units of a phosphorus acid monomer, based on the weight of the shells of the polymer particles.

13. The composition of claim 8 which comprises less than 1% pigment volume concentration of pigment particles with a refractive index in the range of from 2.0 and 3.0.

14. The composition of claim 8 which further includes one or more ingredients selected from the group consisting of dispersants, defoamers, surfactants, solvents, additional binders, coalescents, biocides, opaque polymers, and colorants.

\* \* \* \* \*